(No Model.)
E. MAJOR.
ELASTIC COUPLING FOR STEAM PIPES.
No. 335,371. Patented Feb. 2, 1886.
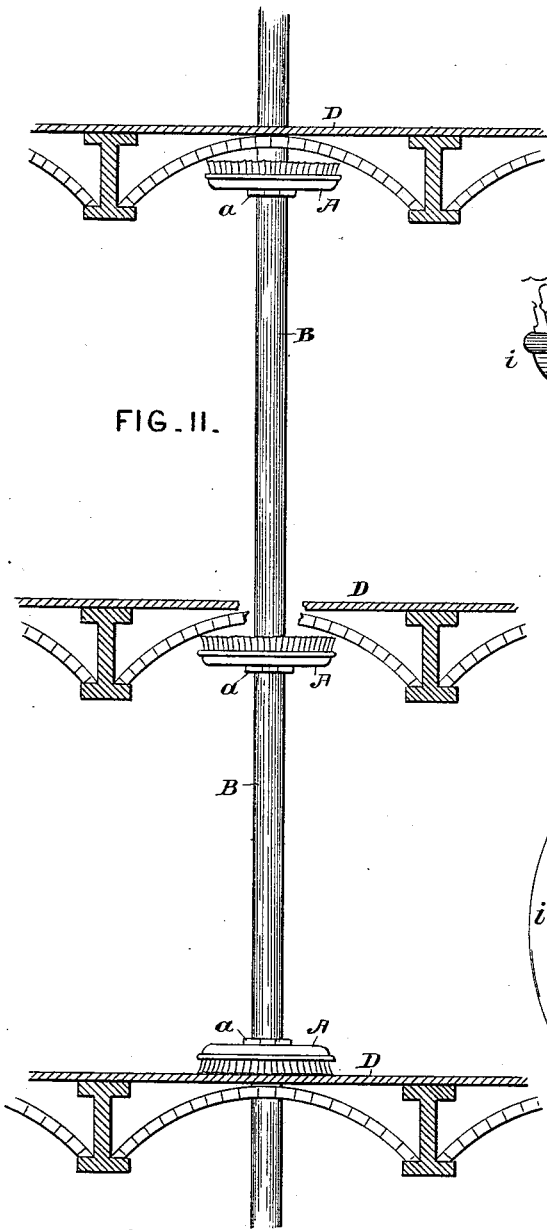
FIG. II.
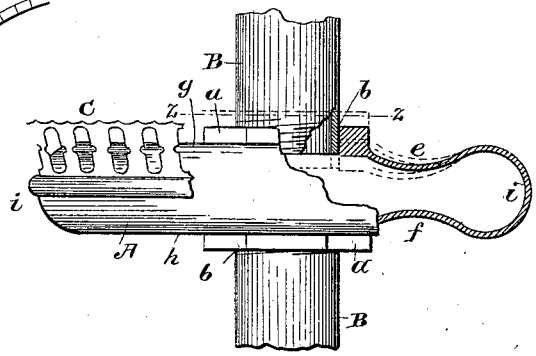
FIG. I.
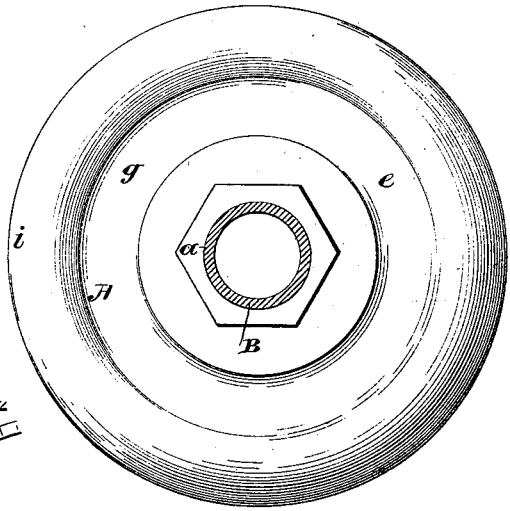
FIG. III.
Attest:
Geo. T. Smallwood.
Harry L. Cinner.
Inventor
Emanuel Major
By E. B. Whitmore
Atty.

UNITED STATES PATENT OFFICE.

UNITED STATES PATENT OFFICE.

EMANUEL MAJOR, OF ROCHESTER, NEW YORK.

ELASTIC COUPLING FOR STEAM-PIPES.

SPECIFICATION forming part of Letters Patent No. 335,371, dated February 2, 1886.

Application filed September 28, 1885. Serial No. 178,450. (No model.)

*To all whom it may concern:*

Be it known that I, EMANUEL MAJOR, of Rochester, in the county of Monroe and State of New York, have invented a new and useful Improvement in Elastic Couplings for Steam-Pipes, which improvement is fully set forth in the following specification, and shown in the accompanying drawings.

The object of my invention is to produce an elastic or yielding expansion coupling or connection for steam-pipes, the same being an imperforate inclosure, with elastic walls and without joints, said invention being fully described in the following specification, and more particularly pointed out in the claims.

Referring to the drawings, Figure I is an elevation of my improved elastic pipe coupling or connection with portions of the connected steam-pipe, a part of said coupling being broken away and radially sectional to disclose the interior thereof and the manner of connecting the steam-pipes therewith, a part of the ornamental band being also broken away, parts of the coupling being shown as in various conditions of expansion and compression by dotted lines; Fig. II, a view showing the adaptation of steam-pipe provided with said elastic couplings to the floors of a building; and Fig. III, a plan of the coupling seen as indicated by arrow in Fig. I, the upper steam-pipe being transversely sectioned as upon the dotted line *z* therein.

Referring to the parts, A is the coupling or connection for the steam-pipes B, which coupling is made circular in plan and formed with central concentric openings, *b*, at the opposite sides, which openings are internally threaded to receive the threaded ends of said steam-pipes. This coupling is preferably made of an elastic metal—as planished copper or cast-brass—and the form substantially that of an oblate spheroid considerably flattened, with the pipes entering at the two flattened sides *g h*, respectively, in the line of the axis of the body. The periphery of this coupling (at *i*) I prefer to make substantially circular in radial longitudinal section, as shown, and compress the walls of the flattened sides at *f* and *e* between said circular part and the openings at the center, which form is favorable to the yielding of the shell or wall of the coupling to strains exerted in a direction at right angles to the plane of the same or in the line of the axis of the pipes. The openings *b* are each surrounded by a thick ring of metal, *a*, to strengthen the coupling at those points and to form sufficiently broad bearing-surfaces for the threaded steam-pipes. These rings or thickened parts are made hexagon shape at their peripheries, to receive a wrench by which to turn them onto the pipes.

The coupling is cast or made otherwise in a single piece, and consequently has no joints to be packed or to leak. The shell of the coupling being elastic, the latter maintains its form while the connected sections of pipes are permitted to vary in length as their temperature changes.

These couplings or connections are most useful when lines of pipe of considerable length are put up, either vertical or horizontal. A coupling being placed between the ends of adjacent lengths allows the whole pipe to freely expand and contract without straining or loosening the joints between said lengths.

I prefer to place an ornamental fringe, C, of some suitable style around the periphery of the coupling, as shown. If the coupling be located near the surface of the floor this fringe is placed to depend therefrom; but if said coupling be placed next the ceiling the ornamental band will be directed upward for the coupling.

The device shown in Fig. II represents a steam-pipe for supplying radiators, passed up through several stories of a building. The lateral pipes leading to the radiators are to be joined to the vertical pipe at any convenient point.

These couplings are as well adapted to be used with hot and cold water pipes or hot and cold air pipes as with steam-pipes.

The compressing of the walls of the coupling at *e* and *f* forms concentric curves in the opposing plates *g* and *h* of the shell.

What I claim as my invention is—

1. In combination with sections of pipe, an elastic coupling for the same, forming a flattened circular inclosure with opposing sides provided, respectively, with central longitudinal orifices internally threaded to receive said pipes, said orifices being surrounded with heads or masses formed to receive a wrench, said sides of the coupling being formed with opposing depressions or valleys, causing the longitudinal distance thereat between said sides to be less than that at points nearer the periphery of the coupling, the peripheral curve of the coupling measuring more than a semicircle on a radial line, substantially as shown.

2. In combination with sections of pipe, an elastic coupling forming a circular inclosure, with opposing sides provided, respectively, with axial longitudinal orifices internally threaded to receive said pipes, said orifices being surrounded with masses formed to receive a wrench, side depressions being formed causing the peripheral curve of the coupling to measure more than a semicircle on a radial line, substantially as shown and described.

E. MAJOR.

Witnesses:
E. B. WHITMORE,
M. KENDRICK.